July 11, 1944.    C. C. BENNETT    2,353,213
REACTION TESTING MECHANISM
Filed June 12, 1941    2 Sheets-Sheet 1
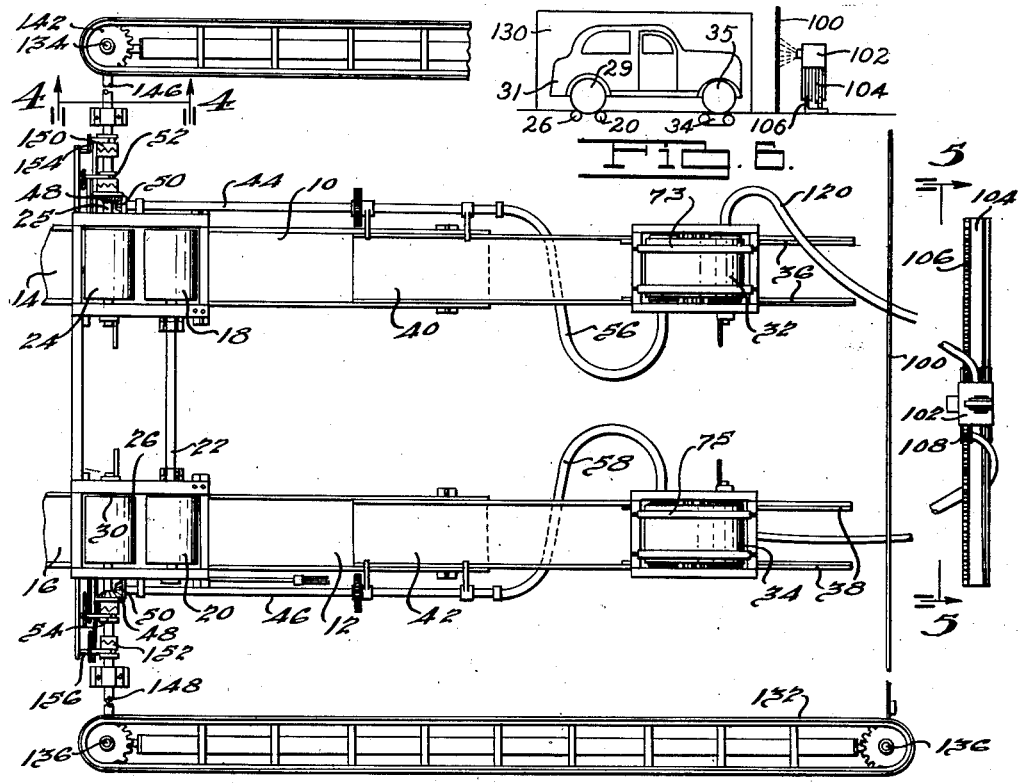
INVENTOR
Claude C. Bennett.
BY Gray & Smith.
ATTORNEYS.

July 11, 1944.　　　C. C. BENNETT　　　2,353,213
REACTION TESTING MECHANISM
Filed June 12, 1941　　　2 Sheets-Sheet 2
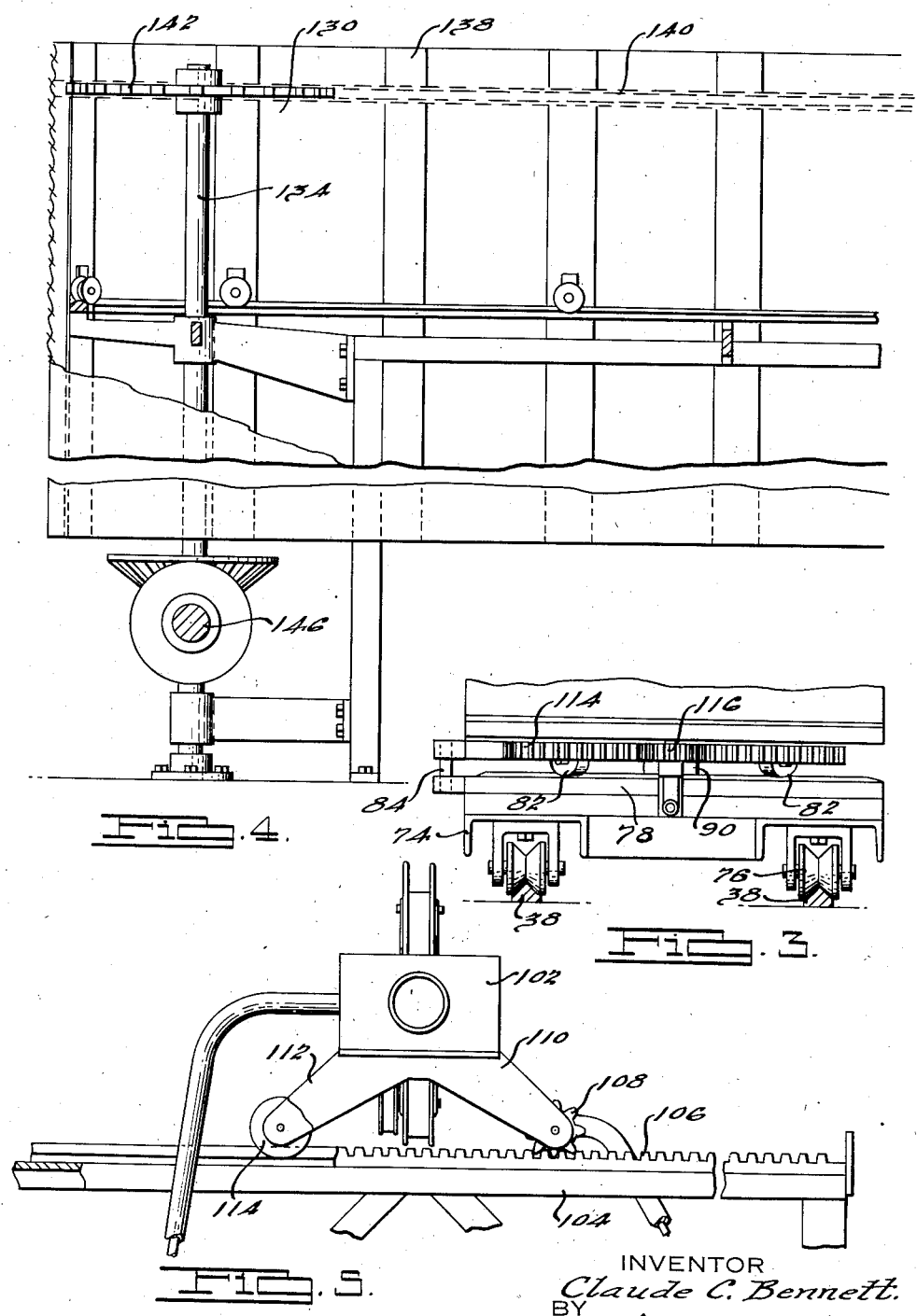
INVENTOR
Claude C. Bennett.
BY
Gray & Smith.
ATTORNEYS.

Patented July 11, 1944

2,353,213

UNITED STATES PATENT OFFICE 2,353,213

REACTION TESTING MECHANISM

Claude C. Bennett, South Bend, Ind.

Application June 12, 1941, Serial No. 397,734

13 Claims. (Cl. 35—11)

This invention relates to testing devices, and more particularly to improved means for testing the reaction of an operator of a motor vehicle to varying conditions such for example as occur in the operation of a motor vehicle upon the highways.

It is desirable in order to prevent unqualified persons from operating motor vehicles that some means be provided to determine whether or not an individual possesses the necessary mental and physical qualifications to enable him to safely operate a motor vehicle upon the highways.

It has heretofore been proposed to test the responsiveness of vehicle drivers to varying stimuli corresponding generally to those encountered in the actual operation of motor vehicles by having the prospective driver operate controls similar to those of a motor vehicle, the controls being connected to operate miniature vehicles on a track in such a manner that the miniature vehicles move in accordance with variations of movement of the controls simulating those of an automotive vehicle.

Other methods of testing the responsiveness of a prospective driver are to have him manipulate controls simulating those of a motor vehicle upon the giving of a signal such for example as the flashing of a light or the ringing of a bell. It has been found that these tests do not give an accurate indication of the responsiveness of a prospective driver to varying conditions such as are encountered in the normal operation of a motor vehicle upon the highways. One of the reasons such tests are not satisfactory is that the operator is subjected to environment and surroundings with which he is not familiar and which do not closely simulate the surroundings and conditions of operation with which he is accustomed in the operation of a vehicle.

An object of this invention is therefore to provide means whereby a prospective driver may be tested in his own vehicle or in a vehicle similar to his own to indicate his reaction to varying conditions closely simulating those encountered in the normal operation of a motor vehicle.

A further object is to provide means for testing the reaction of a particular driver in the particular vehicle which he is accustomed to operate or in a similar vehicle whereby an accurate indication is obtained as to the safeness of operation of the particular driver in the particular vehicle.

Another object is to provide a testing mechanism adapted to receive a motor vehicle in such a manner that the vehicle may be operated as it is operated upon the highway by a driver undergoing test to give an indication of the effect produced by varying the speed and direction of the vehicle whereby it can be accurately determined whether or not the operator possesses the physical and mental characteristics requisite to make him a safe operator of a motor vehicle.

A still further object of the invention is to provide a testing device having a framework adapted to support a motor vehicle and surrounded by suitable shields which may either move or have movement depicted thereon by projected images in such a manner that the operator of the vehicle is subjected to varying conditions closely simulating those encountered in the operation of the vehicle.

A more specific object of the invention is to provide a motion picture projector movably mounted on a carrier extending transversely relative to the vehicle in such a manner that as the operator of the vehicle manipulates the controls of the vehicle to vary the speed and direction of the vehicle, the motion picture projector moves relative to the screen in such a manner as to vary the position of the projected images relative to the vehicle to give the operator the illusion of operating the vehicle under varying traffic conditions.

Still another object of the invention is to provide a reaction testing mechanism for the operator of a motor vehicle wherein longitudinally movable curtains extend along the sides of the vehicle to create the illusion of motion and a laterally movable projector operably connected with the longitudinally movable curtains and the vehicle are provided to vary the transverse position of the projected images relative to the operator of the vehicle to indicate to the operator the effect or result of various manipulations performed by the operator to avoid traffic conditions indicated on the screen positioned in front of the operator by the images projected thereon by the laterally movable projector.

A further object is to provide reaction testing means closely simulating actual operating conditions of a motor vehicle whereby the responsiveness of a prospective driver may be accurately and readily determined.

Other objects and advantages of this invention will be apparent from the following detailed description considered in connection with the accompanying drawings, submitted for purposes of illustration only, and not intended to define the scope of the invention, reference being had for that purpose to the subjoined claims.

In the drawings wherein similar reference characters refer to similar parts throughout the several views:

Fig. 1 is a plan view of a testing device embodying the present invention.

Fig. 2 is a side elevation partly in section of the steerable wheel supporting and driving mechanism.

Fig. 3 is a fragmentary end elevation taken substantially on the line 3—3 of Fig. 2, looking in the direction of the arrows.

Fig. 4 is a side elevation, partly in section, taken substantially on the line 4—4 of Fig. 1, looking in the direction of the arrows, and showing the portion of the supporting and driving mechanism for the longitudinally movable curtains.

Fig. 5 is an end elevation of the motion picture projector supporting and actuating mechanism taken substantially on the line 5—5 of Fig. 1, looking in the direction of the arrows.

Figure 6 is a fragmentary view illustrating the operative position of the device.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring now to the drawings, it will be observed that a pair of spaced runways 10 and 12 preferably having angularly inclined ramps or approaches 14 and 16 respectively are provided to receive a motor vehicle.

Driving wheel supporting means such for example as paired rollers 18 and 20 fixed to a shaft 22 extending from one of the runways 10 to the other runway 12, cooperate with longitudinally spaced rollers 24 and 26 carried by stub shafts 28 and 30 respectively to support the driving or rear wheel 29 of the vehicle 31 in such a manner that the rollers may be rotated by the driving wheels of the vehicle.

Front or steerable wheel supporting means 32 and 34 suitably mounted on longitudinally extending tracks 36 and 38 respectively may be provided to receive the front or steerable wheels 35 of the vehicle. The runways 10 and 12 are provided with telescoping sections 40 and 42 respectively whereby the steerable wheel supporting means 32 and 34 may be moved longitudinally on the tracks 36 and 38 to vary the distance between the front wheel supporting means and the rear wheel supporting means to accommodate vehicles having different length wheel bases.

Means may be provided to drive the front wheel supporting means 32 and 34 at a speed equal to or proportionate to the speed of the driving wheels. One desirable form of such steerable wheel driving means comprises longitudinally extending shafts 44 and 46 respectively operably connected to the shafts 28 and 30 of the rear wheel supporting rollers 24 and 26 respectively. The longitudinally extending shafts 44 and 46 may be operably connected to the shafts 28 and 30 by cooperating pinion gears 48 and 50 carried by the shafts 28 and 30 and the longitudinally extending shafts 44 and 46 respectively. The pinions 48 are preferably loosely mounted on the shafts 28 and 30 and are provided with clutch means positioned to cooperate with cooperating clutching mechanisms 52 and 54 respectively splined or otherwise suitably drivingly connected to and longitudinally movable on the shafts 28 and 30 respectively.

The longitudinally extending shafts 44 and 46 may be operably connected to drive the front wheel supporting means by flexible cables 56 and 58 respectively operably connected to the shafts 44 and 46.

The front wheel supporting means 32 and 34 comprises a pair of longitudinally spaced rollers 60 and 62 mounted on shafts 64 and 66 respectively journalled in a framework 68. A plurality of spaced rollers 70 are interposed between the rollers 60 and 62 in such a manner as to support a belt or flexible wheel supporting member 72 surrounding the spaced rollers 60 and 62. The belt 72 frictionally engages the surface of the rollers 60 and 62 in such a manner as to be driven thereby to roll over the rollers 70 and drive the steerable wheels supported on the belt 72 between the rollers 60 and 62.

Means may be provided to mount the framework 68 on the longitudinally extending tracks 36 and 38 in such a manner that the steerable wheel supporting means 32 and 34 may rotate about a vertical axis under the influence of the steerable wheels as the wheels of the vehicle are turned as in steering the vehicle.

Suitable cradles 73 and 75 carried by the steerable wheel supporting means 32 and 34 may be provided to engage the side walls of the steerable wheels to turn the supporting means 32 and 34 as the wheels are turned to steer the vehicle.

Means may also be provided to so mount the steerable wheel supporting means 32 and 34 that they may move slightly laterally relative to each other and longitudinally on the tracks 36 and 38 to compensate variation of angular position of the steerable wheels caused by the caster, camber and toe-in angles of the steerable wheels of the vehicle. One desirable form of such mounting mechanism comprises a base member 74 having a plurality of spaced rollers 76 positioned to engage the tracks 36 and 38 in such a manner that the wheel supporting means may move longitudinally on the supporting tracks 36 and 38.

The sub-frame 74 carries a frame or plate 78. A plate 80 is mounted on rollers 82 interposed between the plates 78 and 80 in such a manner that the plates may move relative to each other. The plates 78 and 80 are interconnected by a pivot 84 whereby they may move angularly relative to each other. The base 86 of the framework 68 may be directly connected with the plate 80 in such a manner that the wheel supporting member may move rotationally relative to the plate 78 about a pivot point 90 as the steerable wheels of the vehicle are moved angularly when subjected to a steering force.

Means may be provided to indicate to an operator of a vehicle positioned on the test equipment the result of varying the driving speed and steering control to vary the direction of the vehicle. One desirable form of such indicating mechanism comprises a screen 100 positioned ahead of the vehicle on the test apparatus and extending laterally beyond the vehicle as illustrated in Fig. 1. Visual images such for example as typical street traffic scenes may be depicted on the screen in front of the operator by means of a motion picture projector 102 positioned forwardly of the screen 100.

The motion picture projector may be so mounted that it may move laterally relative to the test equipment and the vehicle supported thereon to vary the position of the visual images on the screen 100 being viewed by the operator of the vehicle. One desirable form of movably mounting the projector 102 comprises mounting it on a laterally extending framework 104 having a laterally extending rack 106 positioned to be engaged by a pinion gear 108 carried by the projector 102 to move the entire projector 102 laterally to vary the position of the projected images on the screen 100.

Referring now to Fig. 5, it will be observed that the projector 102 may be provided with laterally extending arms 110 and 112 supporting the pinion 108 and a roller 114 respectively.

Means may be provided to vary the lateral position of the projector 102 in accordance with the angular position of the steerable wheel supporting means 32 and 34 whereby the projector 102 will move laterally to vary the position of the projected images on the screen 100 as the steerable wheels of the vehicle are manipulated as when steering the vehicle.

One desirable form of such control means comprises a gear segment 114 carried by the plate 80 to be engaged by a pinion 116 operably connected through a flexible driving cable 118 to rotate the pinion 108 carried by the arm 110 of the projector 102 to move the projector laterally on the framework 104.

The projector may be operably connected to the steerable wheel supporting members in such a manner that the speed of operation of the projector varies in accordance with variation of speed of the steerable wheel supporting means controlled by the speed of rotation of the driving wheels. One desirable form of such control mechanism comprises a flexible cable such for example as 120 operably connected to one of the steerable wheel supporting shafts 64 or 66 of the wheel driving members 60 or 62. It will be recalled that the speed of movement of the front or steerable wheel supporting means 32 and 34 varies in proportion to the speed of the driving wheels of the vehicle because the steerable wheel supporting means may be driven from the driving wheel supporting means. Since the speed of operation of the motion picture projector 102 varies in proportion to the speed of rotation of the steerable wheels, the images projected on the screen 100 vary in accordance with the speed of the driving wheels controlled by the prospective driver whose reaction is being tested.

The rear wheel supporting rollers 18 and 20 or 24 and 26 together with one or both of the rollers 60 or 62 of the front wheel supporting means may be of sufficient weight to build up an inertia force to simulate the mass or inertia of the vehicle being decelerated. This may be accomplished by making a portion or all of one or both of the wheel supporting rollers of solid material whereby sufficient weight is provided to produce the desired flywheel or inertia effect to more closely simulate actual operation of the vehicle.

In order to make the test appear more realistic to the operator, spaced screens 130 and 132 mounted on vertically extending shafts 134 and 136 respectively may be provided to shield the space between the ends of the screen 100 and extend back beyond the line of vision of the operator undergoing test in the vehicle.

The screens 130 and 132 may as illustrated in Fig. 4 be provided with vertically extending support members 138 such for example as slats, and may be provided with longitudinally extending motion transmitting means such for example as endless chains 140 adapted to mesh with sprocket wheels 142 carried by the shafts 134 and 136.

The shafts 134 and 136 may be driven by laterally extending shafts 146 and 148 respectively operably connected to driving wheel supporting rollers 24 and 26 respectively. The shafts 146 and 148 may be operably connected to the shafts 28 and 30 through cooperating clutch elements 150 and 152 manually controlled by suitable control members 154 and 156.

The screens 130 and 132 may have painted or otherwise reproduced thereon, scenes illustrating typical roadway scenes which the driver of a vehicle would see while operating a vehicle on the highways. It will be noted that the screens 130 and 132 move longitudinally relative to the test apparatus and the motor vehicle positioned thereon to give the operator of the vehicle the illusion of motion. Since the screens 130 and 132 are directly connected with the driving wheel supporting rollers 24 and 26, the screens 130 and 132 move at variable speeds equal or proportionate to the speed of the vehicle as controlled by the operator undergoing test.

In the operation of this device it will be noted that the driver undergoing test is subjected to conditions and environment closely simulating that experienced in the normal operation of a vehicle on the highways. The vehicle is placed upon the test apparatus and the engine of the vehicle started.

The motion picture projector 102 projects on the screen 100 a series of typical traffic scenes corresponding with scenes which the operator of the vehicle would view while driving the vehicle. The scenes projected on the screen 100 can include such scenes as another vehicle coming into the path of the operator under test at intersections in the highways, pedestrians crossing the street and anything else which might cause an operator of a vehicle to get in trouble or have an accident.

The operator undergoing test manipulates the controls of the vehicle, such for example as turning the steering wheel, applying the brakes to stop or slow down the vehicle, and actuating the accelerator to speed up the vehicle. As the accelerator is actuated to speed up the vehicle, the curtains 130 and 132 moving longitudinally relative to the operator move at a speed corresponding to the speed of the driving wheels, and the front or steerable wheels move at the same speed as the driving wheels because of the interconnection between the rear wheel supporting means and the steerable wheel supporting means 32 and 34.

The motion picture projector 102 operates at a speed proportionate to the speed of operation of the vehicle through the flexible driving means 102 operably connected to one of the driven members of the front wheel supporting means to control the speed of the projector 102 in accordance with the speed of the driving wheels of the vehicle. As the operator undergoing test turns the steering wheels to move the front wheel supporting means angularly, to change the angular position of the vehicle with reference to the images projected on the screen 100, the flexible driving means operably connected to the pinion 108 move the projector 102 laterally relative to the vehicle on the framework 104 to give the operator the illusion of maneuvering the vehicle to avoid objects being projected on the screen 100.

When the operator applies the brakes to slow down the vehicle, the inertia or flywheel effect of the wheel supporting rollers tends to continue the vehicle wheels in rotation to simulate the inertia effect tending to continue the vehicle rolling on the highway when the brakes are applied.

I claim:

1. In a reaction testing device, a pair of spaced runways having driving and steerable wheel supporting means to receive the steerable wheels of a motor vehicle, a screen positioned forwardly of the runways, a laterally extending track, a motion picture projector mounted for lateral movement on the track relative to the screen, and means actuated by the steerable wheel supporting means to control the motion picture projector.

2. In a reaction testing device, a pair of spaced runways having spaced wheel supporting means to receive the steerable wheels of a motor vehicle, a screen positioned forwardly of the runways, a motion picture projector positioned to project independent visual images on the screen, and means actuated by the spaced steerable wheel supporting means to control the motion picture projector.

3. A reaction testing machine comprising a plurality of longitudinally spaced members positioned to be driven from the running gear of an automobile, a screen disposed in front of the occupant of the driver's seat of such automobile, a motion picture projector positioned to project images upon said screen, connecting means between the driven members and the projector whereby by manipulation of the normal steering and speed controls of the automobile with respect to images appearing on the screen the reaction of the driver to varying traffic conditions can be determined.

4. A reaction testing device comprising a screen adapted to be disposed in front of the driver's compartment of a motor vehicle, a motion picture projector disposed to project images on said screen, and means responsive to the normal steering and speed controls of such automobile and operatively connected thereto for controlling the projection of images on said screen.

5. A machine for testing the responsiveness of vehicle operators to variable traffic conditions comprising means to produce simulated movable images depicting traffic conditions in front of a stationary automobile, and means operated by the normal speed and steering controls of such automobile for controlling the disposition of such images with respect to the automobile.

6. A machine for testing the reaction of vehicle operators comprising a screen positioned in front of the vehicle, a motion picture projector disposed to project visual images on said screen, means responsive to the normal steering and speed controls of the automobile operatively connected thereto for controlling the projection of images upon the screen, and movable pictorial screens extending longitudinally of the vehicle and operatively connected to be driven at varying speeds by the vehicle in accordance with the speed of the vehicle to simulate motion of the automobile.

7. In a reaction testing device, a pair of spaced runways having rotatable means to support the driving and steerable wheels of a motor vehicle, means to drive the steerable wheel supporting means from the driving wheel supporting means, a screen positioned forwardly of the vehicle and extending laterally of the testing device, a motion picture projector adapted to project visual images on the screen, said projector being movable laterally relative to the screen, and means responsive to steerable movement of the steerable wheels controlling the lateral position of the projector relative to the screen, and means responsive to the speed of the driving wheels controlling the speed of projection of spaced visual images.

8. A reaction testing device comprising a longitudinally extending runway, rotatable means to support the driving wheels of a vehicle, rotatable means to support the steerable wheels of the vehicle, means to drive the rotatable steerable wheel supporting means from the rotatable supporting means for the driving wheels, a screen positioned forwardly of the steerable wheel supporting means, a motion picture projector positioned forwardly of the screen and movable laterally relative to the screen to project visual images thereon, a pair of spaced longitudinally extending screens having images depicting road scenes movable longitudinally of the vehicle, means operably connected to the driving wheel supporting means to drive the longitudinally movable screens, means controlling the speed of projection of the visual images in accordance with the speed of the driving wheel supporting means, and means responsive to movement of the steerable wheel supporting means controlling the lateral position of the projector.

9. A reaction testing device comprising a pair of spaced runways, driving wheel supporting means positioned in the runways, steerable wheel supporting means positioned in the runways and spaced from and longitudinally movable relative to the driving wheel supporting means, means whereby the steerable wheel supporting means may move angularly about a substantially vertical axis in response to steerable movement of the steerable wheels, a screen positioned forwardly of the steerable wheel supporting means, a motion picture projector positioned to project images on the screen, a laterally extending support for the projector, means operable by movement of the steerable wheel supporting means about the substantially vertical axis in response to steerable movement of the wheels controlling the lateral position of the images projected on the screen, and means controlled by the speed of the driving wheels controlling the speed of projection of the images.

10. A reaction testing device comprising rotatable driving wheel supporting members, steerable wheel supporting members spaced from the driving wheel supporting members and movable longitudinally relative thereto, means whereby the steerable wheel supporting means may move angularly in response to steerable movements of the wheels about a substantially vertical axis, a screen, a laterally extending rack spaced from the screen, a motion picture projector positioned on the rack and movable thereon, a flexible driving connection between the steerable wheel supporting means and the projector whereby the projector may move laterally on the rack in proportion to angular movement of the steerable wheel supporting means, a pair of screens extending longitudinally of the vehicle, means to move the screens longitudinally in proportion to speed of the driving wheel supporting means, and means controlling the speed of the projector in accordance with the speed of the driving wheel supporting means whereby the speed and position of the projected images on the screen vary in accordance with the movement of the control members of the vehicle.

11. A reaction testing device comprising a pair of spaced runways having rotatable means to support the driving and steerable wheels of a motor vehicle, means to drive the steerable wheel supporting means, a screen positioned forwardly of the vehicle and extending laterally of the testing device, a motion picture projector adapted to project visual images on the screen, said projector being movable laterally relative to the screen, and means responsive to steerable movement of the steerable wheels controlling the lateral position of the projector relative to he screen.

12. In a reaction testing device, a longitudinally extending runway, rotatable means to support the driving wheels of a vehicle, rotatable means to support the steerable wheels of the vehicle, means to drive the rotatable steerable wheel supporting means, a screen positioned forwardly of the steerable wheel supporting means, a motion picture projector movable laterally relative to the screen to project visual images depicting typical traffic scenes thereon, a pair of spaced longitudinally extending screens having images depicting road scenes movable longitudinally of the vehicle, means operably connected to the driving wheel supporting means to drive the longitudinally movable screens, and means responsive to movement of the steerable wheel supporting means controlling the lateral position of the projector.

13. A reaction testing device comprising a pair of spaced runways, driving and steerable wheel supporting means positioned in the runways, means whereby the steerable wheel supporting means may move angularly about a substantially vertical axis in response to steerable movement of the steerable wheels, a screen positioned forwardly of the steerable wheel supporting means, a motion picture projector positioned to project images on the screen, a laterally extending support for the projector, and motion transmitting means operable by movement of the steerable wheel supporting means about the substantially vertical axis in response to steerable movement of the wheels controlling the lateral position of the images projected on the screen.

CLAUDE C. BENNETT.